US012541159B2

(12) United States Patent
Kimura et al.

(10) Patent No.: US 12,541,159 B2
(45) Date of Patent: Feb. 3, 2026

(54) TONER PARTICLES FOR DEVELOPING ELECTROSTATICALLY CHARGED IMAGE AND TONER COMPOSITION FOR DEVELOPING ELECTROSTATICALLY CHARGED IMAGE

(71) Applicant: TOMOEGAWA CORPORATION, Tokyo (JP)

(72) Inventors: Yudai Kimura, Shizuoka (JP); Ikuko Yatsuzuka, Shizuoka (JP); Takayuki Sano, Shizuoka (JP)

(73) Assignee: TOMOEGAWA CORPORATION, Tokyo (JP)

( * ) Notice: Subject to any disclaimer, the term of this patent is extended or adjusted under 35 U.S.C. 154(b) by 763 days.

(21) Appl. No.: 17/774,606

(22) PCT Filed: Nov. 24, 2020

(86) PCT No.: PCT/JP2020/043601
§ 371 (c)(1),
(2) Date: May 5, 2022

(87) PCT Pub. No.: WO2021/106844
PCT Pub. Date: Jun. 3, 2021

(65) Prior Publication Data

US 2022/0404729 A1 Dec. 22, 2022

(30) Foreign Application Priority Data

Nov. 25, 2019 (JP) ................................ 2019-212354

(51) Int. Cl.
*G03G 9/093* (2006.01)

(52) U.S. Cl.
CPC ................................ *G03G 9/09314* (2013.01)

(58) Field of Classification Search
CPC .................................................. G03G 9/09314
See application file for complete search history.

(56) References Cited

U.S. PATENT DOCUMENTS 5,981,129 A 11/1999 Akazawa
10,228,628 B2 3/2019 Yamashita
(Continued)

FOREIGN PATENT DOCUMENTS

EP 1757992 2/2008
JP H10-293420 A 11/1998
(Continued)

OTHER PUBLICATIONS

International Preliminary Report on Patentability for the corresponding International application No. PCT/JP2020/043601 mailed May 17, 2022, which includes English translation of Written opinion of the International Searching Authority of PCT/JP2020/043601 mailed Jan. 26, 2021.

(Continued)

*Primary Examiner* — Mark F. Huff
*Assistant Examiner* — Boone Alexander Evans
(74) *Attorney, Agent, or Firm* — Muncy, Geissler, Olds & Lowe, P.C.

(57) ABSTRACT

A toner particle for developing an electrostatically charged image includes a toner base particle and a resin coating covering the toner base particle. The toner base particle includes a recess on a surface of the toner base particle. The recess has a depth of 50 nm to 500 nm. The resin coating includes a coating (A) portion having a thickness of 10 nm or more and less than 50 nm and a coating (B) portion having a thickness of 50 nm or more and 500 nm or less, and the coating (B) portion is present on the recess.

14 Claims, 1 Drawing Sheet

(56) References Cited

U.S. PATENT DOCUMENTS

| | | | | |
|---|---|---|---|---|
| 2007/0042285 | A1* | 2/2007 | Kitani | G03G 9/09307 430/110.2 |
| 2009/0286176 | A1 | 11/2009 | Ohmura | |
| 2009/0297224 | A1 | 12/2009 | Kawase et al. | |
| 2015/0017582 | A1 | 1/2015 | Ozawa et al. | |
| 2018/0031991 | A1 | 2/2018 | Yamashita | |
| 2018/0329330 | A1* | 11/2018 | Era | G03G 9/09708 |

FOREIGN PATENT DOCUMENTS

| | | | |
|---|---|---|---|
| JP | 2007-057575 | A | 3/2007 |
| JP | 2009-301026 | A | 12/2009 |
| JP | 2012-037629 | A | 2/2012 |
| JP | 2013-182201 | | 9/2013 |
| JP | 2014-026126 | A | 2/2014 |
| JP | 2017-116712 | A | 6/2017 |
| JP | 2018-017884 | A | 2/2018 |
| JP | 2018-031866 | A | 3/2018 |

OTHER PUBLICATIONS

The extended European search report of the corresponding EP application No. 20892573.5 mailed Nov. 22, 2023.

* cited by examiner

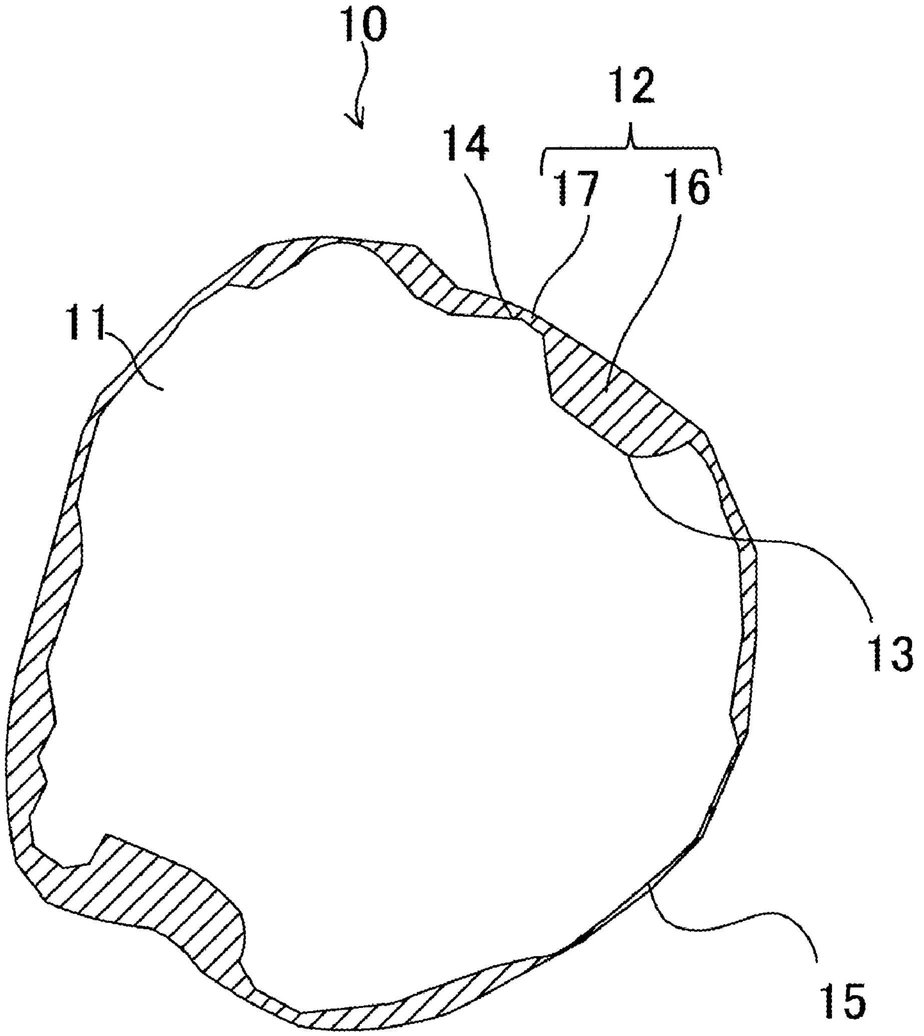
10
12
14
17
16
11
13
15

TONER PARTICLES FOR DEVELOPING ELECTROSTATICALLY CHARGED IMAGE AND TONER COMPOSITION FOR DEVELOPING ELECTROSTATICALLY CHARGED IMAGE

TECHNICAL FIELD

The present invention relates to toner particles for developing an electrostatically charged image and a toner composition for developing an electrostatically charged image.

BACKGROUND ART

Electrophotography is widely used as a means of an image forming method in a copier, a printer, facsimile, and the like. General image formation by electrophotography includes: a developing step of irradiating a photoconductive insulator (photoreceptor) uniformly charged using a charging blade, a charging brush, or the like with laser light, LED light, or the like, and forming an electrostatic latent image, and electrostatically adhering a toner for developing an electrostatically charged image (hereinafter, the same shall apply when such toner is simply referred to as a toner) onto the electrostatic latent image to form a toner image; a transfer step of transferring the toner image to a recording medium such as a medium to be recorded; and a fixing step of melting the transferred toner image on the recording medium by contact with a heating medium, infrared irradiation, or the like, and then radiating heat to fix the toner image.

Regarding such a toner, a toner having a core-shell structure is used in which a toner base particle using a binder resin having a low melting point is covered with a resin coating formed of a resin exhibiting a glass transition temperature (Tg) higher than a Tg of the binder resin of the toner base particle to obtain good fixability in a low temperature range from the viewpoint of power saving, to improve preservation stability at a high temperature, and to improve blocking resistance.

In addition, when the resin coating is a homogeneous film, there is a case where the resin coating is not easily broken even when pressure is applied to the toner in the fixing step, and there has been a problem that the toner is difficult to be favorably fixed on the medium to be recorded. In view of this, Patent Literature 1 suggests that the resin coating is easily broken by a toner for developing an electrostatically charged image, in which a crack derived from an interface between the resin fine particles in a direction substantially perpendicular to the surface of the toner base particle is observed inside the resin coating, whereby the fixability to a medium to be recorded or the like is improved and the more excellent heat-resistant preservability is offered.

CITATION LIST

Patent Literature

Patent Literature 1: JP 2014-026126 A

SUMMARY OF INVENTION

Technical Problem

In the toner for developing an electrostatically charged image of the invention disclosed in Patent Literature 1, a crack is formed inside the shell layer in a direction substantially perpendicular to the surface of the toner core particle, whereby a toner excellent in fixability to a medium to be recorded or the like and in heat-resistant preservability can be obtained. To such ends, it is necessary to array the resin fine particles on the surface of the toner core particle in a state where a crack is generated. When irregularities are present on the surface of the toner core particle, the crack in a direction substantially perpendicular to the surface of the toner core particle, and thus there is a possibility that a toner excellent in fixability to a medium to be recorded or the like and in heat-resistant preservability cannot be obtained. In addition, the crack may lead to bleed-out of the toner core particle, leading to degradation of heat-resistant storability. To prevent this disadvantage, it is considered necessary to increase the particle size of the resin fine particle (particle size: 100 nm) to prevent bleed-out. Therefore, there is a disadvantage that the degree of freedom of toner design is small and applicable image forming apparatuses are limited. Furthermore, the spheroidizing treatment is indispensable in the producing process, and the producing cost may be increased.

In view of this, an object of the present invention is to provide a toner particle for developing an electrostatically charged image, which is hardly affected by the particle size of a resin fine particle and is more excellent in fixability and heat-resistant preservability, by using a toner base particle including a recess.

Solution to Problem

To solve the above-described problems, a toner particle for developing an electrostatically charged image according to the present invention includes a toner base particle including a specific recess and a resin coating having a specific structure. That is, the present invention is as follows.

The present invention (1) is a toner particle for developing an electrostatically charged image, the toner particle including a toner base particle and a resin coating covering the toner base particle, wherein the toner base particle includes a recess on a surface of the toner base particle, the recess includes a recess having a depth of 50 to 500 nm, the resin coating includes a coating (A) portion having a thickness of 10 nm or more and less than 50 nm and a coating (B) portion having a thickness of 50 nm or more and 500 nm or less, and the coating (B) portion is present on the recess.

The present invention (2) is the toner particle for developing an electrostatically charged image according to the present invention (1), wherein the coating (B) portion is a resin layer in which a plurality of resin layers are laminated.

The present invention (3) is the toner particle for developing an electrostatically charged image according to the present invention (2), wherein in the coating (B) portion, a laminating direction of the plurality of resin layers is a direction away from the surface of the toner base particle.

The present invention (4) is the toner particle for developing an electrostatically charged image according to any one of the present inventions (1) to (3), wherein a ratio of a sum of the coating (B) portion included in the resin coating to the resin coating included in the toner particles for developing an electrostatically charged image is 30 to 60%.

The present invention (5) is the toner particle for developing an electrostatically charged image according to any one of the present inventions (1) to (4), wherein an average particle size of the toner particle for developing an electrostatically charged image is 3 to 15 μm.

The present invention (6) is a toner composition for developing an electrostatically charged image, the toner composition comprising the toner particle for developing an electrostatically charged image according to any one of the present inventions (1) to (5).

Advantageous Effects of Invention

According to the present invention, the toner particle for developing an electrostatically charged image can be provided, which is hardly affected by the particle size of the resin fine particles and is more excellent in fixability and heat-resistant preservability, by using toner base particles having specific irregularities.

BRIEF DESCRIPTION OF DRAWINGS

FIG. 1 is an explanatory view of a cross-section of a toner particle for developing an electrostatically charged image.

DESCRIPTION OF EMBODIMENTS

In the present invention, when a simple compound name is used, all isomers thereof shall be included.

In the present invention, a singly-used term "toner" refers to a toner composition containing toner particles for developing an electrostatically charged image.

<<<Toner Particle for Developing Electrostatically Charged Image>>>

In the present invention, the toner particle for developing an electrostatically charged image may be simply described as a toner particle.

The toner particle for developing an electrostatically charged image according to the present invention includes a toner base particle and a resin coating covering the toner base particle.

The average particle size of the toner particle for developing an electrostatically charged image according to the present invention is not particularly limited as long as the effects of the present invention are not inhibited, but can be set to, for example, 3 to 15 μm, preferably 3 to 12 μm, and more preferably 3 to 10 μm. When the average particle size of the toner particle for developing an electrostatically charged image falls within such a range, production is relatively easy, and the effect of suppressing the amount of toner particles used at the time of printing and obtaining clear printing can be obtained.

The average particle size of the toner particle is a volume average particle size, and can be measured using a commercially available apparatus, for example, a Coulter counter.

The toner base particle according to the present invention has a recess on the surface thereof, and the depth of the recess is 50 to 500 nm.

The resin coating according to the present invention has a coating (A) portion having a thickness of 10 nm or more and less than 50 nm and a coating (B) portion having a thickness of 50 nm or more and 500 nm or less.

The coating (B) portion is present on the recess of the toner base particle.

Hereinafter, the configuration of the toner particles for developing an electrostatically charged image according to the present invention will be described in detail.

<<Configuration of Toner Particle for Developing Electrostatically Charged Image>>

FIG. 1 illustrates an explanatory view of a cross-section of a toner particle for developing an electrostatically charged image. Hereinafter, descriptions will be made in detail with reference to FIG. 1. FIG. 1 is an enlarged photograph of one toner particle 10 for developing an electrostatically charged image. In the toner particle 10 for developing an electrostatically charged image, a toner base particle 11 is covered with a resin coating 12, and a recess 13, a protrusion 14, and a flat portion 15 exist on the surface of the toner base particle 11 (only one example is illustrated). This indicates that the coating (B) portion 16 is formed in the recess 13. In addition, a coating (A) portion 17 is formed at or near the protrusion 14 and the flat portion 15.

<Toner Base Particle>

The toner base particle according to the present invention serves as a core material of a toner particle for developing an electrostatically charged image, and is covered with a resin coating.

The shape of the toner base particle is not particularly limited as long as the effects of the present invention are not inhibited, and is not limited to a spherical shape or a shape that is generally deemed to be spherical. The degree of circularity of the toner base particle is 0.90 to 0.96, preferably 0.92 to 0.96. When the degree of circularity of the toner base particle falls within such a range, the flowability of the toner base particle at the time of production is excellent. Thus, the resin fine particles can uniformly adhere to the toner base particle, and such toner base particle has a large number of recesses, and therefore such toner base particle is preferred as a raw material of the toner particle for developing an electrostatically charged image according to the present invention.

Note that the degree of circularity is represented as:

Degree of circularity=π·(diameter of a circle equal in area to particle image)/(perimeter of particle image) and can be determined by a flow particle image analyzer (e.g., trade name: FPIA-2000, manufactured by SYSMEX CORPORATION).

The toner base particle according to the present invention has a recess on the surface thereof. The depth of the recess is 50 nm to 500 nm, preferably 100 nm to 400 nm. When the depth of the recess falls within such a range, the coating (B) portion of the resin coating described later can be formed on the recess with a thickness of 50 to 500 nm. The presence of the coating (B) portion makes the heat-resistant storability of the toner particles excellent.

In addition, the toner base particle has a protrusion and a flat portion on the surface. The protrusion shall be a portion having a vertex whose radius of curvature (or, when the vertex has an angle, the radius of the inscribed sphere inscribed in the plane forming the angle) being shorter than the radius of a sphere whose diameter is the length of the longest line segment included in the toner base particle including the protrusion. The flat portion shall be not only a plane but also a portion whose radius of curvature is identical to or greater than the radius of a sphere whose diameter is the length of the longest line segment included in the toner base particle including the flat portion.

Here, when a tangential plane of a vertex of the protrusion adjacent to the recess or a surface of the flat portion in the vicinity of an intersection between the flat portion and an inner wall of the recess of the flat portion adjacent to the recess is defined as a reference plane of the depth of the recess, the depth of the recess shall be a shortest distance between the reference plane and the bottommost portion of the recess. That is, the depth of the recess shall be a linear distance perpendicular to the lowest reference plane to which the recess is adjacent from the bottommost portion of the recess (reference plane whose distance from the bottommost portion of the recess is the shortest). Calculation is performed based on the criteria described above from the transmission electron microscope (TEM) image of the sample obtained by slicing toner base particle or the toner.

Further, when one recess and another recess are close to each other with a protrusion or a flat portion interposed therebetween, the tangential plane of the vertex of the protrusion or the surface of the flat portion shall not be included in the reference plane of the depth of the recess. For example, when two recesses are formed like a "W" shape, the protrusion at the center of "W" shall not be included in the protrusion forming the reference plane. That is, when the middle protrusion of "W" is lower than an end thereof, the "W"-shaped recess shall be regarded as a large recess in which two recesses are joined.

Here, the opening shape of the recess is not particularly limited. That is, the opening shape is not limited to a geometric shape such as a circular shape or an elliptical shape, and a circumferential shape including an irregular linear portion and an irregular curved portion can be employed. In addition, the shape in the depth direction is not particularly limited. The shape is not limited to a geometric shape such as a conical shape or a spherical shape, and a three-dimensional shape including an irregular linear portion and an irregular curved portion can be employed.

The size of the opening of the recess (opening diameter or minimum length of opening) is not particularly limited, and may be any size as long as resin fine particles forming a resin coating described later can enter the inside the recess. For example, the lower limit value can be set to 10 nm or more, 20 nm or more, 30 nm or more, or 50 nm or more. The upper limit value is not particularly limited, but can be set to 1000 nm or less, 800 nm or less, 600 nm or less, or 500 nm or less. The resin fine particle collides with the inner wall (including the bottom) in the recess, whereby the resin fine particle is crushed to form a layer. Thereafter, another resin fine particle collides with the layered resin fine particle and melts to form a single layer or is laminated to form a laminate structure. By repeating this, the coating (B) portion is formed on the recess. Here, the term "on the recess" is not limited to the case where the coating (B) portion is completely present in the recess, and indicates that a part or all of the coating (B) portion is present on the recess.

The number of recesses included in the toner base particle according to the present invention is not particularly limited, and suffices to be at least one or more. The sum of the opening areas of all the recesses included in the toner base particle is preferably 20% or more, more preferably 30% or more, still more preferably 40% or more of the surface area of the toner base particle. When the sum of the opening areas of all the recesses included in the toner base particle falls within such a range, a toner particle for developing an electrostatically charged image that is excellent in fixability with a medium to be recorded and in heat-resistant preservability can be obtained.

The toner base particle according to the present invention includes a binder resin. The binder resin included in the toner base particle is not particularly limited as long as it is a resin conventionally used as a binder resin for toner. Examples of the binder resin include thermoplastic resins such as styrenic resins, acrylic resins, styrene-acrylic resins, polyethylenic resins, polypropylenic resins, vinyl chloride-based resins, polyester resins, polyamide resins, polyurethane resins, polyvinyl alcohol-based resins, vinyl ether-based resins, N-vinylic resins, and styrene-butadiene resins. These can be used solely or in combination of a plurality of these. Among them, a polystyrenic resin and a polyester resin are preferably included from the viewpoint of dispersibility of the colorant in the binder resin, chargeability of the toner, and fixability to a medium to be recorded. Hereinafter, the polystyrenic resin and the polyester resin will be described.

The polystyrenic resin may be a homopolymer of styrene, or may be a copolymer with another copolymerizable monomer copolymerizable with styrene. Specific examples of other copolymerizable monomers copolymerizable with styrene include p-chlorostyrene; vinylnaphthalene; ethylene unsaturated monoolefins such as ethylene, propylene, butylene, and isobutylene; vinyl halides such as vinyl chloride, vinyl bromide, and vinyl fluoride; vinyl esters such as vinyl acetate, vinyl propionate, vinyl benzoate, and vinyl butyrate; (meth)acrylic acid esters such as methyl acrylate, ethyl acrylate, n-butyl acrylate, isobutyl acrylate, dodecyl acrylate, n-octyl acrylate, 2-chloroethyl acrylate, phenyl acrylate, methyl α-chloroacrylate, methyl methacrylate, ethyl methacrylate, and butyl methacrylate; other acrylic acid derivatives such as acrylonitrile, methacrylonitrile, and acrylamide; vinyl ethers such as vinyl methyl ether and vinyl isobutyl ether; vinyl ketones such as vinyl methyl ketone, vinyl ethyl ketone, and methyl isopropenyl ketone; and N-vinyl compounds such as N-vinylpyrrole, N-vinylcarbazole, N-vinylindole, and N-vinylpyrrolidone. These copolymerizable monomers can be copolymerized with a styrene monomer by combining two or more of these.

For the polyester resin, a polyester resin obtained by condensation polymerization or co-condensation polymerization of a divalent, trivalent, or higher-valent alcohol component and a divalent, trivalent, or higher-valent carboxylic acid component can be used. Examples of the component used in synthesizing the polyester resin include the following alcohol components and carboxylic acid components.

Specific examples of the divalent, trivalent, or higher-valent alcohol components include diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, and polytetramethylene glycol; bisphenols such as bisphenol A, hydrogenated bisphenol A, polyoxyethylenated bisphenol A, and polyoxypropylenated bisphenol A; and trivalent or higher-valent alcohols such as sorbitol, 1,2,3,6-hexanetetrol, 1,4-sorbitane, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Specific examples of the divalent, trivalent, or higher-valent carboxylic acid components include divalent carboxylic acids such as maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azelaic acid, malonic acid, or alkyl or alkenyl succinic acids including n-butylsuccinic acid, n-butenylsuccinic acid, isobutylsuccinic acid, isobutenylsuccinic acid, n-octylsuccinic acid, n-octenylsuccinic acid, n-dodecyl succinic acid, n-dodecenylsuccinic acid, isododecylsuccinic acid and isododecenylsuccinic acid; and trivalent or higher-valent carboxylic acids such as 1,2,4-benzenetricarboxylic acid (trimellitic acid), 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and Empol trimer acid. These divalent, trivalent or higher-valent carboxylic acid components can each be employed as an ester-forming derivative such as an acid halide, an acid anhydride, or a lower alkyl ester. Here, "lower alkyl" means an alkyl group having 1 to 6 carbon atoms.

When the toner is used as a magnetic one-component toner, a resin having one or more functional groups selected from the group consisting of a hydroxyl group, a carboxyl group, an amino group, and an epoxy group (glycidyl group) in the molecule of the resin is used as the binder resin. By using the binder resin having these functional groups in its molecule, dispersibility of a magnetic powder, a charge control agent, and the like in the binder resin can be improved. Note that presence or absence of these functional groups can be confirmed using a Fourier transform infrared spectrophotometer (FT-IR). Further, the amount of these functional groups in the resins can be measured using publicly known methods such as titration.

A thermoplastic resin is preferably used as the binder resin due to having a good fixability to a medium to be recorded. The thermoplastic resin may be used not only solely, but also by adding a crosslinking agent and/or a thermosetting resin. By adding the crosslinking agent and/or the thermosetting resin and introducing a partial crosslinked structure into the binder resin, heat-resistant preservability, and durability of the toner may be improved without degrading the fixability of the toner. Note that when a thermosetting resin is used, the amount of crosslinked part (gel amount) in the binder resin extracted using a Soxhlet extractor is preferably 10 mass % or less, and more preferably 0.1 mass % or more and 10 mass % or less, per the mass of the binder resin.

The thermosetting resin usable together with the thermoplastic resin is preferably epoxy resins and cyanate-based resins. Specific examples of suitable thermosetting resins include bisphenol A-type epoxy resins, hydrogenated bisphenol A-type epoxy resins, novolac-type epoxy resins, polyalkylene ether-type epoxy resins, cyclic aliphatic-type epoxy resins, and cyanate resins. These may be used solely or in a combination of two or more of these.

The glass transition temperature (Tg) of the binder resin is preferably 40° C. or more and 70° C. or less. An excessively high glass transition temperature tends to lead the degradation of low-temperature fixability of the toner. An excessively low glass transition temperature tends to lead the degradation of heat-resistant preservability of the toner.

The glass transition temperature of the binder resin can be determined from a change point of specific heat of the binder resin using a differential scanning calorimeter (DSC). More specifically, the glass transition temperature of the binder resin can be determined by measuring an endothermic curve of the binder resin using a differential scanning calorimeter DSC-6200 manufactured by Seiko Instruments Inc. as a measuring apparatus. A measurement sample in an amount of 10 mg is put into an aluminum pan, and an empty aluminum pan is used as a reference. The glass transition temperature of the binder resin can be determined from the endothermic curve of the binder resin obtained by measuring at normal temperature and normal humidity under a measuring temperature range of 25° C. or more and 200° C. or less, a temperature-increase rate of 10° C./min.

The softening point of the binder resin is preferably 70° C. or more and 130° C. or less, and more preferably 80° C. or more and 120° C. or less. The softening point of the polyester can be measured by a method in accordance with JIS K7196: 1991 "Testing method for softening temperature of thermoplastic film and sheeting by thermomechanical analysis".

The mass average molecular weight (Mw) of the binder resin is not particularly limited as long as the object of the present invention is not inhibited. Typically, the mass average molecular weight (Mw) of the binder resin is preferably 20,000 or more and 300,000 or less, and more preferably 30,000 or more and 200,000 or less. Note that the mass average molecular weight of the binder resin can be determined using a calibration curve prepared in advance using a standard polystyrene resin by gel permeation chromatography (GPC).

In addition, when the binder resin is a polystyrenic resin, the binder resin preferably has a peak in each of regions of lower molecular weight and higher molecular weight, in molecular weight distribution measured by gel permeation chromatography or the like. Specifically, the peak of molecular weight in a region of lower molecular weight preferably falls within a range of 3,000 or more and 20,000 or less, and the peak of molecular weight in a region of higher molecular weight preferably falls within a range of 300,000 or more and 1,500,000 or less. For the polystyrenic resin having such a molecular weight distribution, a ratio (Mw/Mn) of mass average molecular weight (Mw) to number average molecular weight (Mn) is preferably 10 or more. By using the binder resin having each peak in respective regions of lower molecular weight and higher molecular weight falling within such ranges in molecular weight distribution, a toner excellent in low-temperature fixability and capable of suppressing high-temperature offset can be obtained.

The toner base particle according to the present invention can contain other additives such as silica, titanium oxide, alumina, carbon, and magnetic powder (iron powder).

<Resin Coating>

The resin coating according to the present invention is formed by gathering of resin fine particles. By causing resin fine particles to collide with the toner base particle, the resin fine particles are deformed and adhered, whereby the resin coating is formed.

The resin coating according to the present invention covers the entire surface or a part of the surface of the toner base particle. The coverage ratio of the resin coating covering the surface of the toner base particle is not particularly limited as long as the effects of the present invention are not inhibited, but can be set to, for example, 80% or more, and is preferably 85% or more, and more preferably 90% or more. When the coverage ratio of the resin coating falls within such a range, toner particles for developing an electrostatically charged image that are excellent in fixability to a medium to be recorded and in heat-resistant preservability can be obtained.

The coverage ratio of one toner particle for developing an electrostatically charged image is calculated by the following steps. The steps include photographing a cross-section of a randomly selected toner particle for developing an electrostatically charged image using a transmission electron microscope such that the cross-section of one particle is wholly included in one image (for example, the magnification is set to 10,000 times), measuring the length of the coated outer peripheral portion of the cross-section of the toner particle for developing an electrostatically charged image in the obtained image, and dividing the measured length by the entire length of the outer peripheral portion of the cross-section of the toner particle for developing an electrostatically charged image in the obtained image. The same measurement is performed on 10 toner particles for developing an electrostatically charged image, and the average value thereof is defined as the coverage ratio.

The resin coating according to the present invention includes a coating (A) portion having a thickness of 10 nm or more and less than 50 nm, and a coating (B) portion having a thickness of 50 nm or more and 500 nm or less. The coating (B) portion is present on the recess included in the toner base particle.

The coating (A) portion is mainly formed on a portion other than the recess (protrusion or flat portion) of the toner base particle. When the resin fine particles collide with a portion other than the recess (protrusion or flat portion) of the toner base particle, the resin fine particles form a film and grow in the thickness direction, but the toner base particle remains exposed. When the resin fine particles further continuously collide, the film having a certain thickness or more is scraped by the collision, and becomes a coating (A) portion having a thickness of 10 nm or more and less than 50 nm.

In the coating (A) portion, the resin fine particles may be softened and melted to form a single layer film, or a plurality of resin layers may be laminated.

The coating (B) portion is formed on an upper portion of the recess of the toner base particle. When the resin fine particles collide with the inner wall portion (including the bottom) of the recess of the toner base particle, the resin fine particles form a film, and the film grows in the thickness direction. In the recess, since the formed film is protected by the inner wall of the recess, continuous collision of the resin fine particles is restricted. Therefore, until the film has a thickness equal to or greater than the depth of the recess, the thickness of the film continuously grows to be a coating (B) portion. When the thickness of the coating (B) portion is equal to or greater than the depth of the recess, the coating (B) portion is exposed to collision of the resin fine particles, and the film having a thickness significantly protruding from the inside of the recess is scraped by the collision, so that the coating (B) portion having a thickness of 50 nm or more and 500 nm or less, which is equivalent to the depth of the recess, is obtained.

It is sufficient that the thickness of the coating (B) portion be 50 to 500 nm, and at least a part thereof be present inside the recess of the toner base particle.

In the coating (B) portion, the resin fine particles may be softened and melted to form a single layer film, or a plurality of resin layers may be laminated. When the coating (B) portion is formed by laminating a plurality of resin layers, the laminating direction can be set to a direction away from the surface of the toner base particle.

In one toner particle for developing an electrostatically charged image, the sum of the coating (B) portions can be set to 10 to 80% of the entire resin coating, and is preferably 30 to 60%. When the ratio of the sum of the coating (B) portion to the entire resin coating (occupancy rate) falls within such a range, a toner particle for developing an electrostatically charged image that is excellent in fixability to a medium to be recorded and in heat-resistant preservability can be obtained.

The ratio of the sum of the coating (B) portion to the entire resin coating (occupancy rate) can be determined by the following steps. The steps include photographing a cross-section of a randomly selected toner particle for developing an electrostatically charged image using a transmission electron microscope such that the cross-section of one particle is wholly included in one image (for example, the magnification is set to 10,000 times), measuring the length of the coating (B) portion included in the outer peripheral portion of the cross-section of the toner particle for developing an electrostatically charged image in the obtained image, and dividing the measured length by the length of the outer peripheral portion of the entire coating in a cross-section of the toner particle for developing an electrostatically charged image in the obtained image. The same measurement is performed on 10 toner particles for developing an electrostatically charged image, and the average value of the measurement results is defined as the ratio of the sum of the coating (B) portion to the entire resin coating (occupancy rate).

The shape of the resin fine particle is not particularly limited, but is preferably spherical. Here, the "spherical shape" is not limited to a perfectly spherical shape, and includes a substantially spherical shape. It suffices to be a shape that is generally deemed as a spherical shape. For example, when the major axis is L and the minor axis is S, ellipsoids each having an aspect ratio (L/S) of 1 to 2 are also included. In a case where the resin fine particles are spherical, when the resin fine particles collide with the inner wall in the recess of the toner base particle, a uniform resin layer can be formed because the resin fine particles are highly symmetrical. When the uniform resin layer is formed, a good laminated state can be ensured, and the coating (B) portion can have a sufficient thickness in the toner base particle. As a result, the toner particle for developing an electrostatically charged image has excellent heat-resistant storability.

The resin fine particles that form the resin coating according to the present invention are not particularly limited as long as the effects of the present invention are not inhibited. Since it is easy to form a resin coating having a predetermined structure, the resin fine particles forming the resin coating are preferably a polymer of a monomer having an unsaturated bond. Further, the resin fine particles are preferably a resin that can be synthesized by soap-free emulsion polymerization. This is because when resin fine particles are produced by soap-free emulsion polymerization, resin fine particles having a uniform particle size and containing no or almost no surfactant can be prepared. The standard deviation (variation) of the particle size of the resin fine particles will be described later.

The kind of the monomer having an unsaturated bond is not particularly limited as long as a resin having sufficient physical properties as a resin coating can be synthesized. The monomer having an unsaturated bond is preferably a vinylic monomer. In the vinyl group contained in the vinylic monomer, the $\alpha$-position may be substituted with an alkyl group. Further, the vinyl group contained in the vinylic monomer may be substituted with a halogen atom. The alkyl group that the vinyl group may have is preferably an alkyl group having 1 to 6 carbon atoms, more preferably a methyl group or an ethyl group, and particularly preferably a methyl group. Further, the halogen atom that the vinyl group may have is preferably a chlorine atom or a bromine atom, and more preferably a chlorine atom.

The vinylic monomer may have a nitrogen-containing polar functional group, or may have a fluorine-substituted hydrocarbon group. When a vinylic monomer having a nitrogen-containing polar functional group is used in producing resin, positive chargeability can be imparted to the obtained resin. When a vinylic monomer having a fluorine-substituted hydrocarbon group is used in producing resin, negative chargeability can be imparted to the obtained resin. When the resin having positive chargeability or the resin having negative chargeability is used as a material of the resin coating, a toner that can be charged to a desired charge amount can be obtained even when the charge control agent is not blended in the toner base particles or the blending amount of the charge control agent into the toner base particles is reduced.

Among vinylic monomers, specific examples of the monomer free of nitrogen-containing polar functional group or fluorine-substituted hydrocarbon group include styrenes such as styrene, o-methylstyrene, m-methylstyrene, p-methylstyrene, p-ethyl styrene, 2,4-dimethyl styrene, p-n-butyl styrene, p-tert-butyl styrene, p-n-hexyl styrene, p-n-octylstyrene, p-n-nonylstyrene, p-n-decylstyrene, p-n-dodecyl styrene, p-methoxystyrene, p-ethoxystyrene, p-phenylstyrene, p-chlorostyrene, and 3,4-dichlorostyrene; ethylenically unsaturated monoolefins such as ethylene, propylene, butylene, and isobutylene; halogenated vinyls such as vinyl chloride, vinylidene chloride, vinyl bromide, and vinyl fluoride; vinyl esters such as vinyl acetate, vinyl propionate, vinyl benzoate, and vinyl butyrate; (meth)acrylic acid esters such as methyl (meth)acrylate, ethyl (meth)acrylate, n-butyl (meth)acrylate, isobutyl (meth)acrylate, propyl (meth)acrylate, n-octyl (meth)acrylate, dodecyl (meth)acrylate, 2-ethylhexyl (meth)acrylate, stearyl (meth)acrylate, 2-chloroethyl (meth)acrylate, phenyl (meth)acrylate, and methyl α-chloroacrylate; (meth)acrylic acid derivatives such as acrylonitrile; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; and vinyl naphthalines. Among these, styrenes are preferred and styrene is more preferred. These monomers can be used in a combination of two or more of these.

Examples of the vinylic monomer having a nitrogen-containing polar functional group include N-vinyl compounds, amino(meth)acrylic monomers, and methacrylonitrile (meth)acrylamide. Specific examples of the N-vinyl compound include N-vinylpyrrole, N-vinylcarbazole, N-vinylindole, and N-vinylpyrrolidone. Examples of the suitable amino(meth)acrylic monomer are the compounds represented by the following formula.

$$CH_2{=}C\,(R^1){-}(CO){-}X{-}N(R^2)(R^3)$$

(In the formula, R1 represents hydrogen atom or a methyl group. R2 and R3 each represent a hydrogen atom or an alkyl group having 1 to 20 carbon atoms. X represents —O—, —O-Q-, or —NH. Q represents an alkylene group having 1 to 10 carbon atoms, a phenylene group, or a combination of these groups.)

In the above-described formula, specific examples of R2 and R3 include methyl, ethyl, n-propyl, iso-propyl, n-butyl, iso-butyl, sec-butyl, tert-butyl, n-pentyl, iso-pentyl, tert-pentyl, n-hexyl, n-heptyl, n-octyl, 2-ethylhexyl, n-nonyl, n-decyl, n-undecyl, n-dodecyl (lauryl), n-tridecyl, n-tetradecyl, n-pentadecyl, n-hexadecyl, n-heptadecyl, n-octadecyl (stearyl), n-nonadecyl, and n-icosyl groups.

In the above-described formula, specific examples of Q include methylene, 1,2-ethane-diyl, 1,1-ethylene, propane-1,3-diyl, propane-2,2-diyl, propane-1,1-diyl, propane-1,2-diyl, butane-1,4-diyl, pentane-1,5-diyl, hexane-1,6-diyl, heptane-1,7-diyl, octane-1,8-diyl, nonane-1,9-diyl, decane-1,10-diyl, p-phenylene, m-phenylene, and o-phenylene groups, and divalent groups obtained by removing hydrogen atom at the 4 position of a phenyl group in a benzyl group.

Specific examples of the amino(meth)acrylic monomer represented by the above-described formula include N,N-dimethylamino(meth)acrylate, N,N-dimethylaminomethyl (meth)acrylate, N,N-diethylaminomethyl (meth)acrylate, 2-(N,N-methylamino)ethyl (meth)acrylate, 2-(N,N-diethylamino)ethyl (meth)acrylate, 3-(N,N-dimethylamino)propyl (meth)acrylate, 4-(N,N-dimethylamino)butyl (meth)acrylate, p-N,N-dimethylaminophenyl (meth)acrylate, p-N,N-diethylaminophenyl (meth)acrylate, p-N,N-dipropylaminophenyl (meth)acrylate, p-N,N-di-n-butylaminophenyl (meth)acrylate, p-N-laurylaminophenyl (meth)acrylate, p-N-stearylaminophenyl (meth)acrylate, (p-N,N-dimethylaminophenyl)methyl (meth)acrylate, (p-N,N-diethylaminophenyl)methyl (meth)acrylate, (p-N,N-di-n-propylaminophenyl)methyl (meth)acrylate, (p-N,N-di-n-butylaminophenyl)methylbenzyl (meth)acrylate, (p-N-laurylaminophenyl)methyl (meth)acrylate, (p-N-stearylaminophenyl)methyl (meth)acrylate, N,N-dimethylaminoethyl (meth)acrylamide, N,N-diethylaminoethyl (meth)acrylamide, 3-(N,N-dimethylamino)propyl (meth)acrylamide, 3-(N,N-diethylamino)propyl (meth)acrylamide, p-N,N-dimethylaminophenyl (meth)acrylamide, p-N,N-diethylaminophenyl (meth)acrylamide, p-N,N-di-n-propylaminophenyl (meth)acrylamide, p-N,N-di-n-butylaminophenyl (meth)acrylamide, p-N-laurylaminophenyl (meth)acrylamide, p-N-stearylaminophenyl (meth)acrylamide, (p-N,N-dimethylaminophenyl)methyl (meth)acrylamide, (p-N,N-diethylaminophenyl)methyl (meth)acrylamide, (p-N,N-di-n-propylaminophenyl)methyl (meth)acrylamide, (p-N,N-di-n-butylaminophenyl)methyl (meth)acrylamide, (p-N-laurylaminophenyl)methyl (meth)acrylamide, and (p-N-stearylaminophenyl)methyl (meth)acrylamide.

The vinylic monomer having a fluorine-substituted hydrocarbon group is not particularly limited as long as it is used for producing a fluorine-containing resin. Specific examples of the vinylic monomer having a fluorine-substituted hydrocarbon group include fluoroalkyl (meth)acrylates such as 2,2,2-trifluoroethyl acrylate, 2,2,3,3-tetrafluoropropyl acrylate, 2,2,3,3,4,4,5,5-octafluoroamyl acrylate, and 1H,1H,2H,2H-heptadecafluorodecyl acrylate; trifluorochloroethylene; vinylidene fluoride; trifluoroethylene; tetrafluoroethylene; trifluoropropylene; hexafluoropropene; and hexafluoropropylene. Among these, fluoroalkyl (meth)acrylates are preferred.

The method for addition polymerization of a monomer having an unsaturated bond is not limited as long as the object of the present invention is not inhibited, and any method such as solution polymerization, bulk polymerization, emulsion polymerization, or suspension polymerization can be selected. Among these production methods, an emulsion polymerization process is preferred because resin fine particles having a uniform particle size can be easily obtained.

In the polymerization of the vinylic monomers described above, publicly known polymerization initiators such as potassium persulfate, acetyl peroxide, decanoyl peroxide, lauroyl peroxide, benzoyl peroxide, azobisisobutyronitrile, 2,2'-azobis-2,4-dimethylvaleronitrile, and 2,2'-azobis-4-methoxy-2,4-dimethylvaleronitrile can be used. The amount of these polymerization initiators used is preferably 0.1 mass % or more and 15 mass % or less per the total mass of monomers.

The polymerization process of the vinylic monomer is not limited as long as the object of the present invention is not inhibited, and any method such as solution polymerization, bulk polymerization, emulsion polymerization, or suspension polymerization can be selected. Among these production methods, an emulsion polymerization process is preferred because resin fine particles having a uniform particle size can be easily obtained.

A method for producing the resin fine particles by an emulsion polymerization process is preferably a soap-free emulsion polymerization process without using an emulsifier (surfactant). In the soap-free emulsion polymerization process, radicals of an initiator generated in an aqueous phase bind monomers slightly dissolved in the aqueous phase, and as polymerization proceeds, particle cores of insolubilized resin fine particles are formed. According to the soap-free emulsion polymerization process, resin fine particles having a narrow particle size distribution can be obtained, and the average particle size of the resin fine particles is easily controlled within the range of 10 to 100 nm. Therefore, according to the soap-free emulsion polymerization process, resin fine particles having a uniform particle size can be obtained.

By using the resin fine particles having a uniform particle size and obtained by the soap-free emulsion polymerization process, the variation in the adhesive force of the resin fine particles to the toner base particle is reduced, whereby a homogeneous resin coating having a uniform thickness can be formed. Further, since the resin fine particles produced by the soap-free emulsion polymerization process are formed without using an emulsifier (surfactant), a resin coating that is hardly affected by moisture can be formed by using the resin fine particles obtained by the soap-free emulsion polymerization process.

The resin fine particles can be prepared as necessary so as to contain the above-described colorant, charge control resin, and the like. When a sufficient amount of the charge control agent is contained in the resin fine particles, the charge control agent may not be contained in the toner base particles.

The glass transition temperature of the resin fine particles (the glass transition temperature of the resin constituting the resin fine particle) is not particularly limited, but can be set to, for example, 50 to 100° C., and is preferably 50 to 80° C. When the glass transition temperature falls within such a range, the toner is easily fixed on the medium to be recorded in a low temperature range, and aggregation of the toner hardly occurs when the medium to be recorded is stored at a high temperature (heat-resistant storability is high).

The glass transition temperature of the resin constituting the resin fine particle can be determined from a change point in specific heat of the resin constituting the resin fine particle using a differential scanning calorimeter (DSC).

The softening point of the resin constituting the resin fine particle is not particularly limited as long as the object of the present invention is not inhibited. Typically, the softening point of the resin constituting the resin fine particle is preferably 100° C. or more and 250° C. or less, and more preferably 110° C. or more and 240° C. or less. In addition, the softening point of the resin constituting the resin fine particle is preferably higher than the softening point of the binder resin included in the toner base particles, and more preferably higher than that by 10 to 140° C. By setting the temperature characteristic of the resin constituting the resin fine particle within such a range, when the resin fine particles are embedded in the toner base particle, the portion of the resin fine particle in contact with the toner base particle is hardly deformed. Thus, a protrusion derived from the shape of the resin fine particle before changing to the resin coating is easily formed on the inner surface of the resin coating.

The softening point of the resin constituting the resin fine particle can be measured by a flow tester. Hereinafter, a method for measuring the softening point of the resin constituting the resin fine particle by the flow tester will be described.

The average particle size of the resin fine particles is not particularly limited as long as the effects of the present invention are not inhibited, but can be set to, for example, 10 to 100 nm, preferably 20 to 80 nm, and more preferably 20 to 50 nm. When the average particle size of the resin fine particles falls within such a range, the resin fine particles enter the recess of the toner base particle and collide with the inner wall portion, whereby the coating (B) portion is easily formed and aggregation hardly occurs.

The average particle size of the resin fine particles can be calculated by measuring the particle sizes of 50 or more of resin fine particles from an electron micrograph taken using a scanning microscope, and measuring the number average particle size.

As described above, it is important to uniform the particle sizes of the individual resin fine particles, that is, to reduce the standard deviation (variation) of the particle sizes of the resin fine particles. The standard deviation of the particle size of the resin fine particles is not particularly limited as long as the effects of the present invention are not inhibited, but is preferably, for example, 0.15 or less, and more preferably 0.14 or less. The lower limit value of the standard deviation of the particle size of the resin fine particles is 0.0. When the standard deviation of the particle size of the resin fine particles falls within such a range, the variation in the particle size of each of the resin fine particles is small and the degree of aggregation of the resin fine particles is small, even though the resin fine particles having the same average particle size are used. Thus, the resin fine particles easily enter the recess of the toner base particle, and the coating (B) portion is easily formed. The standard deviation of the particle size of the resin fine particles can be measured by a publicly known particle measuring instrument.

The standard deviation of the particle size of the resin fine particles can be adjusted by (1) a method in which the resin fine particles are sieved to remove particles larger than a predetermined particle size and particles smaller than the predetermined particle size, (2) a method in which aggregates of the aggregated resin fine particles are disaggregated by applying ultrasonic waves, and the like, in addition to by using a polymerization process in which the particle sizes of the resin fine particles can be easily made uniform.

The mass average molecular weight (Mw) of the resin constituting the resin fine particle is not particularly limited as long as the object of the present invention is not inhibited. Typically, the mass average molecular weight is preferably 20,000 or more and 1,500,000 or less. The mass average molecular weight (Mw) of the resin constituting the resin fine particle can be measured by gel permeation chromatography according to a conventionally known method.

<Others>

The toner particles for developing an electrostatically charged image according to the present invention can be treated with a desired external additive after forming a resin coating on the surface of the toner base particles.

The kind of the external additive is not particularly limited as long as the object of the present invention is not inhibited, and the external additive can be selected from external additives conventionally used for toner. Specific examples of the external additive include silica and metal oxides such as alumina, titanium oxide, magnesium oxide, zinc oxide, strontium titanate, and barium titanate. These external additives can be used solely or in combination of two or more of these. The particle size of the external additive is not particularly limited as long as the object of the present invention is not inhibited, and typically, preferred is 0.01 μm or more and 1.0 μm or less.

The amount of the external additive to be used is not particularly limited as long as the object of the present invention is not inhibited. Typically, the amount of the external additive used is preferably 0.1 mass % or more and 10 mass % or less, and more preferably 0.2 mass % or more and 5 mass % or less, per the total mass of the toner particles produced by forming a resin coating on the surface of the toner base particles. Too small amount of the external additive used leads to the degradation of hydrophobicity of the toner. As a result, in a high-temperature and high-humidity environment, the toner is easily affected by water molecules in the air, and problems such as degradation in image density of a formed image due to extreme degradation in the charge amount of the toner and degradation in flowability of the toner easily occur. In addition, too large amount of the external additive used may lead to cause degradation in image density due to excessive charge-up of the toner.

The toner particles for developing an electrostatically charged image according to the present invention can also be used as a toner composition for developing an electrostatically charged image to be a two-component developer (hereinafter, it may be simply referred to as a two-component developer) by mixing with a desired carrier. When a two-component developer is prepared, it is preferable to use a magnetic carrier as a carrier.

Examples of a suitable carrier in the case of employing the toner particles for developing an electrostatically charged image according to the present invention as a two-component developer include a carrier in which a carrier core material is covered with a resin.

Specific examples of the carrier core material include particles such as iron, oxidized iron, reduced iron, magnetite, copper, silicon steel, ferrite, nickel, and cobalt; alloy particles of these materials and manganese, zinc, or aluminum; particles such as iron-nickel alloy and iron-cobalt alloy; ceramic particles such as titanium oxide, aluminum oxide, copper oxide, magnesium oxide, lead oxide, zirconium oxide, silicon carbide, magnesium titanate, barium titanate, lithium titanate, lead titanate, lead zirconate, and lithium niobate; particles of high permittivity materials such as ammonium dihydrogen phosphate, potassium dihydrogen phosphate, and Rochelle salts; and resin carriers obtained by dispersing these magnetic particles into resins.

Specific examples of the resin that covers the carrier core material include (meth)acrylic polymers, styrenic polymers, styrene-(meth)acrylic copolymers, olefinic polymers (polyethylene, chlorinated polyethylene, polypropylene, and the like), polyvinyl chloride, polyvinyl acetate, polycarbonate, cellulose resins, polyester resins, unsaturated polyester resins, polyamide resins, polyurethane resins, epoxy resins, silicone resins, fluorine resins (polytetrafluoroethylene, polychlorotrifluoroethylene, polyvinylidene fluoride, and the like), phenol resins, xylene resins, diallyl phthalate resins, polyacetal resins, and amino resins. These resins can be used solely or in combination of two or more of these.

The particle size of the carrier is not particularly limited as long as the object of the present invention is not inhibited, but is preferably 20 μm or more and 200 μm or less, and more preferably 30 μm or more and 150 μm or less in terms of a particle size measured by an electron microscope.

The apparent density of the carrier is not particularly limited as long as the object of the present invention is not inhibited. The apparent density varies depending on the composition and surface structure of the carrier, but typically, preferred is 2400 kg/m$^3$ or more and 3000 kg/m$^3$ or less.

When the toner for developing an electrostatically charged image according to the present invention is used as a two-component developer, the content of the toner is preferably 1 mass % or more and 20 mass % or less, and more preferably 3 mass % or more and 15 mass % or less, per the mass of the two-component developer. By setting the content of the toner in the two-component developer within such a range, the image density of the formed image can be maintained at a desired density, and contamination due to the toner inside the image forming apparatus and adhesion of the toner to the transfer recording medium or the like can be suppressed by suppressing toner scattering.

<<Method for Producing Toner Particle for Developing Electrostatically Charged Image>>

The method for producing the toner for developing an electrostatically charged image described above is not particularly limited as long as the toner base particle and the resin coating are formed so as to have the respective predetermined structures. In addition, an external addition treatment for adhering an external additive to the surface of the toner base particle covered with the resin coating can be performed as necessary. Hereinafter, as a suitable method for producing a toner for developing an electrostatically charged image, a method for producing a toner base particle, a method for forming a resin coating, and a method of external addition treatment will be described in detail.

<Method for Producing Toner Base Particle>

The method for producing the toner base particle is not particularly limited as long as any component such as a colorant, a release agent, a charge control agent, or a magnetic powder can be well dispersed in the binder resin. Specific examples of a suitable method for producing the toner base particle include a method in which a binder resin and other additives are mixed by a mixer or the like, then the binder resin and a component to be blended in the binder resin are melt-kneaded by a kneader such as a single screw or twin screw extruder, and the cooled kneaded product is pulverized and classified. The average particle size of the toner base particles is not particularly limited as long as the object of the present invention is not inhibited, but generally, preferred is 2 μm or more and 15 μm or less. In addition, after the kneaded product of the toner base particles is pulverized, the spheroidization treatment can be performed as long as the effects of the present invention are not inhibited.

<Method for Forming Resin Coating>

The resin coating is formed using the resin fine particles. More specifically, the resin fine particles are formed by a step of forming a resin fine particle layer coating the surface of the resin fine particles by causing the resin fine particles to collide with the surface of the toner base particle and adhere to the surface of the toner base particle.

As a method for forming the resin coating with the resin fine particles, a publicly known method can be used, and a method using a mixer capable of mixing the toner base particles and the resin fine particles under a dry condition or a wet condition can be employed. Specific examples thereof include a method of forming a resin coating on the surface of the toner base particle using a mixer capable of applying a mechanical external force to the toner base particle with the resin fine particles adhered to the surface of the toner base particle while adhering the resin fine particles to the surface of the toner base particle. Examples of the mechanical external force include shear force applied to the toner base particle due to shear between the toner base particles or shear generated between the toner base particle and an apparatus inner wall, a rotor, a stator, or the like when the toner base particle moves at a high speed in a narrow space in the mixer, and impulsive force applied to the toner base particle due to collision between the toner base particles, collision between the toner base particle and the apparatus inner wall, or the like.

More specifically, by mixing the toner base particle and the resin fine particle in the mixer, the resin fine particles are caused to collide with and adhere to the surface of the toner base particle. The resin fine particles adhered onto the recess of the toner base particle (which may be a film shape) further collide with the subsequent resin fine particles on the recess, and are integrated or laminated by melting due to the energy of the collision without being discharged from above the recess, thereby thickening the film to have a thickness of 50 nm or more and 500 nm or less (coating (B) portion). On the other hand, as for the resin fine particles adhered to a portion other than the recess of the toner base particle, adhesion and grinding of the subsequent resin fine particles to the previously adhered film are repeated, thereby forming a film of 10 nm or more and less than 50 nm (coating (A) portion).

In the above-described method, when the mechanical external force is strong, the deformation of the resin fine particles becomes too large, leading to a case where the surface of the resin coating may not be formed. The conditions for forming the resin coating having predetermined irregularities vary depending on the device or material used for forming the resin coating, but the operating conditions are changed stepwise so that the mechanical external force applied to the toner base particle covered with the resin fine particles is not too strong, and the structure of the resin coating of the toner obtained under each condition is checked, whereby suitable conditions for forming a predetermined resin coating can be determined for various devices.

The amount of the resin fine particles used is not particularly limited as long as the effect of the present invention is not inhibited. Typically, the amount of the resin fine particles used is preferably 1 part by mass or more and 20 parts by mass or less, and more preferably 3 parts by mass or more and 15 parts by mass or less per 100 parts by mass of the toner base particles. When the amount of the resin fine particles used falls within such a range, the surface of the toner base particles can be entirely covered, so that the toner base particles can be hardly aggregated during high-temperature storage, and heat-resistant preservability is improved.

Examples of an apparatus capable of applying mechanical external force to the toner base particles covered with the resin fine particles while coating the toner base particle with the resin fine particles include Hybridizer NETS-1 (manufactured by NARA MACHINERY CO., LTD.), Cosmos System (manufactured by Kawasaki Heavy Industries, Ltd.), Henschel mixer (manufactured by NIPPON COKE & ENGINEERING CO., LTD.), Multi-Purpose Mixer (manufactured by NIPPON COKE & ENGINEERING CO., LTD.), COMPOSI (manufactured by NIPPON COKE & ENGINEERING CO., LTD.), Mechanofusion system (manufactured by HOSOKAWA MICRON CORPORATION), MECHANOMILL (manufactured by OKADA SEIKO CO., LTD.), and NOBILTA (manufactured by HOSOKAWA MICRON CORPORATION).

<Method of External Addition Treatment>

The method for treating the toner particles for developing an electrostatically charged image using the external additive is not particularly limited, and the toner particles for developing an electrostatically charged image can be treated according to a conventionally known method. Specifically, the treatment conditions are adjusted so that the particles of the external additive are not buried in the toner particles for developing an electrostatically charged image, and the toner particles for developing an electrostatically charged image can be treated using the external additive by a mixer such as a Henschel mixer or a Nauta mixer.

<<Use of Toner Particles for Developing Electrostatically Charged Image>>

The toner particles for developing an electrostatically charged image according to the present invention described above are excellent in fixability and heat-resistant preservability, and thus can be suitably used in various image forming apparatuses.

EXAMPLES

<<<Production of Toner Particle for Developing Electrostatically Charged Image>>>

The toner particles for developing an electrostatically charged image of each of examples and comparative examples were adjusted by the following method. The particle size and the standard deviation of the particle size of the resin fine particles used in each of examples and comparative examples are listed in Table 2. In addition, the coverage ratio of the coating (A) portion, the coverage ratio of the coating (B) portion, and the coverage ratio of the entire resin coating covering the toner particle for developing an electrostatically charged image (the coverage ratio of the resin coating covering toner base particle in the toner particle for developing an electrostatically charged image) in the produced toner particles for developing an electrostatically charged image of each of examples and comparative examples are listed in Table 2. Note that these numerical values were measured using the above-described method.

Example 1

Toner base particle raw materials (polyester resin, wax, carbon black, charge control agent) were mixed in an amount of parts by weight listed in Table 1, and the resulting mixture was subjected to a heat-melt kneading treatment with a commercially available extruder. The mixture after the treatment was coarsely crushed by a hammer mill, then finely pulverized by a jet mill, and classified into 8 μm in average particle size by an airflow-driven air classifier to obtain toner base particles. The obtained toner base particles each had a recess of 50 nm or more and 500 nm or less.

The obtained toner base particles and resin fine particles (styrene acrylic resin: average particle size of 40 nm, standard deviation of particle size of 0.11) were stirred, and then the styrene acrylic resin was collided with the toner base particles in a mixer, and silica was externally added to the obtained particles, whereby toner particles according to the present invention were obtained. It was confirmed that the obtained toner base particles include particles having a coating (B) portion formed on the recess having a depth of 50 nm or more and 500 nm or less. In the toner particles of Example 1, the ratio of the coating (B) portion (the coverage ratio of the coating (B) portion) was 35% with respect to the entire resin coating. The coverage ratio of the coating (B) portion in each of examples and comparative examples was measured by the method described above. In addition, all of the resin coatings except for the coating (B) portion were coating (A) portions. Furthermore, the coating (B) portion was a resin coating in which resin was laminated in a layer, and as a lamination method, the coating (B) portion was laminated in a direction away from the surface of the toner base particle.

Example 2

Toner particles of Example 2 were obtained in the same manner as in Example 1 except that the amount of resin fine particles (styrene acrylic resin) was changed to 8 parts by weight. In the toner particles of Example 2, the ratio of the coating (B) portion was 56% with respect to the entire resin coating. In addition, all of the resin coatings except for the coating (B) portion were coating (A) portions. Furthermore, the coating (B) portion was a resin coating in which resin was laminated in a layer, and as a lamination method, the coating (B) portion was laminated in a direction away from the surface of the toner base particle.

Example 3

Toner particles of Example 3 were obtained in the same manner as in Example 1 except that the toner base particle raw material (polyester resin) was changed to a styrene acrylic resin and the parts by weight of each raw material was changed to the values listed in Table 1. In the toner particles of Example 3, the ratio of the coating (B) portion was 35% with respect to the entire resin coating. In addition, all of the resin coatings except for the coating (B) portion were coating (A) portions. Furthermore, the coating (B) portion was a resin coating in which resin was laminated in a layer, and as a lamination method, the coating (B) portion was laminated in a direction away from the surface of the toner base particle.

Example 4

Toner particles of Example 4 were obtained in the same manner as in Example 1 except that the resin fine particles (styrene acrylic resin) were changed to an acrylic resin (average particle size 40 nm, standard deviation of particle size 0.12). In the toner particles of Example 4, the ratio of the coating (B) portion was 35% with respect to the entire resin coating. In addition, all of the resin coatings except for the coating (B) portion were coating (A) portions. Furthermore, the coating (B) portion was a resin coating in which resin was laminated in a layer, and as a lamination method, the coating (B) portion was laminated in a direction away from the surface of the toner base particle.

Example 5

Toner particles of Example 5 were obtained in the same manner as in Example 1 except that parts by weight of resin fine particles (styrene acrylic resin) was changed to the value listed in Table 1. In the toner particles of Example 5, the ratio of the coating (B) portion was 70% with respect to the entire resin coating. In addition, all of the resin coatings except for the coating (B) portion were coating (A) portions. Furthermore, the coating (B) portion was a resin coating in which resin was laminated in a layer, and as a lamination method, the coating (B) portion was laminated in a direction away from the surface of the toner base particle.

Example 6

Toner particles according to the present invention were obtained in the same manner as in Example 1 except that resin fine particles whose standard deviation of particle size was reduced by sieving (styrene acrylic resin: average particle size 40 nm, standard deviation of particle size 0.06) were used. In the toner particles of Example 6, the ratios of the coating (A) portion and the coating (B) portion were both 50%.

Example 7

Toner particles according to the present invention were obtained in the same manner as in Example 1 except that resin fine particles whose standard deviation of particle size was reduced by sieving (styrene acrylic resin: average particle size 40 nm, standard deviation of particle size 0.147) were used. In the toner particles of Example 7, the ratios of the coating (A) portion and the coating (B) portion to the entire resin coating were 67% and 33%, respectively.

Example 8

Toner particles according to the present invention were obtained in the same manner as in Example 1 except that resin fine particles whose standard deviation of particle size was reduced by sieving (styrene acrylic resin: average particle size 40 nm, standard deviation of particle size 0.135) were used. In the toner particles of Example 8, the ratios of the coating (A) portion and the coating (B) portion to the entire resin coating were 66% and 34%, respectively.

Comparative Example 1

Toner particles were obtained in the same manner as in Example 1 except that the parts by weight of the resin fine particles (styrene acrylic resin) were changed to the value listed in Table 1. In the toner particles of Comparative Example 1, since the amount of the resin fine particles was small, the coating (B) portion was not formed (that is, the resin coating of 50 nm or more was not formed).

Comparative Example 2

Per 100 parts by weight of the toner base particles obtained in the same manner as in Example 1, 1 part by weight of methylol melamine and 4 parts by weight of a styrene-butyl acrylate copolymer, together with ion exchanged water were added to a three-necked flask having a capacity of 1 L and equipped with a stirring blade. The internal temperature of the flask was maintained at 30° C. using a water bath, and the mixture was stirred. Dilute hydrochloric acid was added into the flask to adjust the pH of the aqueous solution in the flask to 4. After adjusting the pH, a methylol melamine aqueous solution (solid content concentration: 80 mass %) and a fine particle dispersion of a styrene-butyl acrylate copolymer (hydrophobic thermoplastic resin) were added to prepare a mixed liquid.

Into the above-described mixed liquid, 100 parts by weight of the toner base particles obtained by the method of Example 1 was added. The mixture was stirred, then the temperature was raised to 70° C., and stirring was continued for 2 hours. Thereafter, to adjust the pH of the aqueous solution in the flask to 7, sodium hydroxide was added to stop the reaction. The inside of the flask was cooled to normal temperature to obtain a toner dispersion having a resin coating layer.

The obtained toner dispersion was filtered to obtain a toner cake. The obtained toner cake was subjected to washing treatment with water and drying treatment for drying the washed toner cake. A toner was produced by using a resin coating forming step by a polymerization process through external addition treatment of adhering an external additive to the dried toner surface.

When the cross-section of the toner particle of Comparative Example 2 was observed, a toner in which a substantially uniform resin coating layer was formed and the thickness of the resin coating was 100 nm was obtained (that is, the coating (A) portion was not formed). Further, the resin coating was a resin layer constituted by a single layer.

Comparative Example 3

Toner particles of Comparative Example 3 were obtained in the same manner as in Comparative Example 2 except that the amount of the methylol melamine aqueous solution was changed to 2 parts by weight and the amount of the styrene-butyl acrylate copolymer was changed to 8 parts by weight. A toner in which a substantially uniform resin coating was formed on the cross-section of the toner particle obtained in Comparative Example 3 and the thickness of the resin layer was 250 nm was obtained (that is, the coating (A) portion was not formed). Further, the resin coating was a resin layer constituted by a single layer.

Comparative Example 4

A toner particle of Comparative Example 4 was obtained in the same manner as in Example 1 except that no resin coating material was used and silica was externally added to the obtained toner base particle.

Comparative Example 5

Toner particles were obtained in the same manner as in Example 1 except that the resin fine particles of Example 1 were changed to resin fine particles having a large standard deviation of particle size (styrene acrylic resin: average particle size 38 nm, standard deviation of particle size 0.19). In the obtained toner particles, the coating (B) portion was not formed, and only the coating (A) portion was formed.

Comparative Example 6

Toner particles were obtained in the same manner as in Example 1 except that the resin fine particles of Example 1 were changed to resin fine particles having a large standard deviation of particle size (styrene acrylic resin: average particle size 41 nm, standard deviation of particle size 0.23). In the toner particles obtained in the same manner as in the comparative example 5, the coating (B) portion was not formed, and only the coating (A) portion was formed.

<<Measurement of Physical Property Values>>

For the raw materials of examples and comparative examples, physical property values were measured by the following measurement method. The results are listed in Table 1.

<Method for Measuring Glass Transition Temperature Tg>

About 10 mg of toner base particles and resin fine particles as raw materials were weighed and put in a cell made of aluminum, and placed on a differential scanning calorimeter (SSC-5200 manufactured by Seiko Instruments & Electronics Ltd.), and 50 milliliters of $N_2$ gas was blown thereinto in 1 minute. Thereafter, a process of raising the temperature at 20 to 150° C. at a rate of 10° C. per 1 minute and then rapidly cooling from 150° C. to 20° C. was repeated twice, the amount of absorbed heat in the second time was measured, and the temperature of the peak was defined as the glass transition temperature. The raw materials of examples and comparative examples were also measured in the same manner.

<Softening Point Measurement>

A flow softening point was adopted as the softening point, and measurement was performed under the following measuring apparatus and measurement conditions. The flow softening point was measured as a temperature in the middle of the moving distance from the start to the end of descent of the plunger of the measuring apparatus. Each obtained sample was weighed in an amount of 2.0 g, put into a die, and measured.

Measuring instrument: Koka flow tester CF-500 manufactured by SHIMADZU CORPORATION Measurement conditions: plunger: 1 $cm^2$ Die diameter: 1 mm Length of die: 1 mm load: 20 KgF Preheating temperature: 50 to 80° C.

Preheating time: 300 sec

Temperature-increase rate: 6° C./min

<Standard Deviation of Particle Size>

The standard deviation of the particle size of the resin fine particles was measured by a laser diffraction particle size analyzer SALD-2300 after the resin fine particles diluted with EP water to 2.5 wt % were ultrasonically dispersed for 10 minutes.

<<<Evaluation>>>

The evaluation of each of examples and comparative examples was performed by the following method. The results are listed in Table 1.

<<Heat-Resistant Storability>>

The toner particles in an amount of 10 g of each of examples and comparative examples was put into a plastic container having a volume of 200 mL, and left to stand in a temperature & humidity chamber ("PH-3KT" manufactured by ESPEC CORP.) set at 50° C. for 50 hours, and taken out. Next, three kinds of sieves having a sieve opening of 150 μm, a sieve opening of 75 μm, and a sieve opening of 45 μm were attached in this order to a powder tester (PT-S manufactured by Hosokawa Micron Corporation), and 2 g of toner particles were then put on the sieve having a sieve opening of 150 μm. The toner particles were sieved out under the condition of a rheostat level of 2 and a time of 10 seconds, the weight of the toner remaining on the sieve was measured, and a, b, c, and the degree of aggregation were calculated from the following equations.

In addition, the degree of aggregation was calculated also for toner particles whose standing temperature was changed from 50° C. to room temperature (25° C.) by the above-described method. The difference between the obtained two degrees of aggregation was defined as heat-resistant storability.

$$\text{Degree of aggregation(mass \%)} = a+b+c$$

a=(Weight of residual toner on sieve having sieve opening of 150 μm/2)×100 b=(Weight of residual toner on sieve having sieve opening of 75 μm/2)×100×(3/5)

c=(Weight of residual toner on sieve having sieve opening of 45 μm/2)×100×(1/5)

The evaluation criteria were as follows.

◎: The difference between the two degrees of aggregation was 5% or less.

○: The difference between the two degrees of aggregation was more than 5% and 10% or less.

x: The difference between the two degrees of aggregation are more than 10%<

<<Fixability>>

A fixing machine in which a heat-fixing roller whose surface layer is formed of Teflon (registered trademark) and a pressure-fixing roller whose surface layer is formed of silicone rubber rotate in pairs was adjusted so that a roll pressure force was 1 Kg/cm$^2$ and a roll speed was 50 mm/sec, and the surface temperature of the heat-fixing roller was changed stepwise to fix the toner image on the transfer paper having the unfixed image at each surface temperature.

The surface temperature of the heat-fixing roller of the fixing machine was set to 120° C., and the toner image on the transfer paper on which the unfixed image was formed was fixed. Then, the image density of the formed fixed image was measured using a reflective densitometer (produced by Macbeth, trade name: RD-914), then the fixed image was rubbed with a cotton pad (trade name: PPC pad, produced by DYNIC CORPORATION), and then the image density was measured in the same manner. The fixing strength was calculated from the obtained measured value by the following equation, and the fixability was evaluated.

Fixing strength(%)=(Image density of fixed image after rubbing/image density of fixed image before rubbing)×100

The evaluation criteria were as follows.

◎: Fixing strength was 80% or more

○: Fixing strength was 70% or more and less than 80%

Δ: Fixing strength was 60% or more and less than 70% x: Fixing strength was less than 60%

TABLE 1

| | | Example | | | | | | | | Comparative Example | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Toner base particle | Polyester resin | 82 | 82 | | 82 | 82 | 82 | 82 | 82 | 82 | 82 | 82 | 82 | 82 | 82 |
| | Styrene acrylic resin | | | 82 | | | | | | | | | | | |
| | Wax | 8 | 8 | 8 | 8 | 8 | 8 | 8 | 8 | 8 | 8 | 8 | 8 | 8 | 8 |
| | Carbon black | 8 | 8 | 8 | 8 | 8 | 8 | 8 | 8 | 8 | 8 | 8 | 8 | 8 | 8 |
| | Charge control agent | 2 | 2 | 2 | 2 | 2 | 2 | 2 | 2 | 2 | 2 | 2 | 2 | 2 | 2 |
| Physical properties of base particle (binder resin) | Tg (° C.) | 50 | 50 | 45 | 50 | 50 | 50 | 50 | 50 | 50 | 50 | 50 | 50 | 50 | 50 |
| | Softening point (° C.) | 95 | 95 | 92 | 95 | 95 | 95 | 95 | 95 | 95 | 95 | 95 | 95 | 95 | 95 |
| Resin fine particle | Styrene acrylic resin | 5 | 8 | 5 | | 10 | 5 | 5 | 5 | 1 | | | | 5 | 5 |
| | Acrylic resin | | | | 5 | | | | | | | | | | |
| | Methylol melamine | | | | | | | | | | 1 | 2 | | | |
| | Styrene-butyl acrylate copolymer | | | | | | | | | | 4 | 8 | | | |
| Physical properties of resin fine particle | Tg (° C.) | 80 | 80 | 80 | 75 | 80 | 80 | 80 | 80 | 80 | 90 | 90 | — | 80 | 80 |
| | Softening point (° C.) | 140 | 140 | 140 | 135 | 140 | 140 | 140 | 140 | 140 | 155 | 155 | — | 140 | 140 |
| Other | Silica | 1 | 1 | 1 | 1 | 1 | 1 | 1 | 1 | 1 | 1 | 1 | 1 | 1 | 1 |
| Evaluation | Heat-resistant storability | ○ | ◎ | ○ | ○ | ◎ | ○ | ○ | ○ | X | ○ | ◎ | X | X | X |
| | Fixability | ◎ | ○ | ◎ | ◎ | Δ | ◎ | ◎ | ◎ | ○ | X | X | ◎ | ◎ | ◎ |

TABLE 2

| | | Example 1 | Example 2 | Example 3 | Example 4 | Example 5 | Example 6 | Example 7 | Example 8 | Example 9 |
|---|---|---|---|---|---|---|---|---|---|---|
| Resin fine particle | Average particle size (nm) | 40 | 40 | 40 | 40 | 40 | 40 | 40 | 40 | 40 |
| | Standard deviation of particle size | 0.11 | 0.11 | 0.11 | 0.12 | 0.11 | 0.06 | 0.147 | 0.135 | 0.11 |
| | Film (A) portion | 65% | 44% | 65% | 65% | 30% | 50% | 67% | 66% | 65% |
| Coating ratio | Film (B) portion | 35% | 50% | 35% | 35% | 70% | 50% | 33% | 34% | 35% |
| | Entire resin film | 90% | 96% | 90% | 90% | 100% | 90% | 90% | 90% | 87% |

TABLE 2-continued

| | | Comparative Example 1 | Comparative Example 2 | Comparative Example 3 | Comparative Example 4 | Comparative Example 5 | Comparative Example 6 |
|---|---|---|---|---|---|---|---|
| Resin fine particle | Average particle size (nm) | 40 | — | — | — | 38 | 41 |
| | Standard deviation of particle size | 0.11 | — | — | — | 0.19 | 0.23 |
| Coating ratio | Film (A) portion | 100% | 0% | 0% | — | 100% | 100% |
| | Film (B) portion | 0% | 100% | 100% | — | 0% | 0% |
| | Entire resin film | 70% | 100% | 100% | 0% | 90% | 90% |

REFERENCE SIGNS LIST

10 Toner particle for developing electrostatically charged image
11 Toner base particle
12 Resin coating
13 Recess
14 Protrusion
15 Flat portion
16 Coating (B) portion
17 Coating (A) portion

The invention claimed is:

1. A toner particle for developing an electrostatically charged image, the toner particle comprising:
a toner base particle; and
a resin coating covering a surface of the toner base particle, wherein
the toner base particle includes a recess on the surface of the toner base particle,
the recess has a depth of 50 nm to 500 nm,
the resin coating includes a coating (A) portion having a thickness of 10 nm or more and less than 50 nm and a coating (B) portion having a thickness of 50 nm or more and 500 nm or less, and
the coating (B) portion is present on the recess,
a ratio of a sum of the coating (B) portion included in the resin coating to a sum of the resin coating included in the toner particles for developing the electrostatically charged image is 30 to 60%, and
the resin coating is formed with resin fine particles that are produced without using an emulsifier and are composed of a material that is different from the toner base particle, and that have particle sizes,
the standard deviation of the particle sizes of the resin fine particle is 0.15 or less.

2. The toner particle for developing an electrostatically charged image according to claim 1, wherein the coating (B) portion is a resin layer in which a plurality of resin layers are laminated.

3. The toner particle for developing an electrostatically charged image according to claim 2, wherein in the coating (B) portion, a laminating direction of the plurality of resin layers is a direction away from the surface of the toner base particle.

4. The toner particle for developing an electrostatically charged image according to claim 1, wherein an average particle size of the toner particle for developing an electrostatically charged image is 3 to 15 μm.

5. The toner particle for developing an electrostatically charged image according to claim 2, wherein an average particle size of the toner particle for developing an electrostatically charged image is 3 to 15 μm.

6. The toner particle for developing an electrostatically charged image according to claim 3, wherein an average particle size of the toner particle for developing an electrostatically charged image is 3 to 15 μm.

7. A toner composition for developing an electrostatically charged image, the toner composition comprising:
the toner particle for developing an electrostatically charged image according to claim 1.

8. A toner composition for developing an electrostatically charged image, the toner composition comprising:
the toner particle for developing an electrostatically charged image according to claim 2.

9. A toner composition for developing an electrostatically charged image, the toner composition comprising:
the toner particle for developing an electrostatically charged image according to claim 3.

10. A toner composition for developing an electrostatically charged image, the toner composition comprising:
the toner particle for developing an electrostatically charged image according to claim 4.

11. A toner composition for developing an electrostatically charged image, the toner composition comprising:
the toner particle for developing an electrostatically charged image according to claim 5.

12. A toner composition for developing an electrostatically charged image, the toner composition comprising:
the toner particle for developing an electrostatically charged image according to claim 6.

13. The toner particle for developing an electrostatically charged image according to claim 4, wherein
an average particle size of the resin fine particles is ranged from 20 to 50 nm.

14. The toner particle for developing an electrostatically charged image according to claim 13, wherein
the resin fine particle is formed of a polymer of a monomer having an unsaturated bond, and
a mass average molecular weight of the polymer forming the resin fine particle is ranged from 20,000 to 1,500,000.

* * * * *